(12) United States Patent
Balderrama

(10) Patent No.: US 11,280,529 B2
(45) Date of Patent: Mar. 22, 2022

(54) REFRIGERANT VOLUME CONTROL

(71) Applicant: Trane International Inc., Davidson, NC (US)

(72) Inventor: Jose Luis Balderrama, Tyler, TX (US)

(73) Assignee: Trane International Inc., Davidson, NC (US)

( * ) Notice: Subject to any disclaimer, the term of this patent is extended or adjusted under 35 U.S.C. 154(b) by 172 days.

(21) Appl. No.: 16/436,233

(22) Filed: Jun. 10, 2019

(65) Prior Publication Data

US 2020/0386454 A1    Dec. 10, 2020

(51) Int. Cl.
| | | |
|---|---|---|
| *F24F 11/30* | (2018.01) | |
| *F25B 41/20* | (2021.01) | |
| *F25B 49/02* | (2006.01) | |
| *F25B 41/31* | (2021.01) | |

(52) U.S. Cl.
CPC .............. *F25B 41/20* (2021.01); *F24F 11/30* (2018.01); *F25B 41/31* (2021.01); *F25B 49/02* (2013.01); *F25B 2600/2513* (2013.01)

(58) Field of Classification Search
CPC .......... F25B 41/20; F25B 41/31; F25B 49/02; F25B 2600/2513; F24F 11/30
See application file for complete search history.

(56) References Cited

U.S. PATENT DOCUMENTS

| | | | |
|---|---|---|---|
| 4,045,977 A | 9/1977 | Oliver, Jr. | |
| 4,484,452 A | 11/1984 | Houser, Jr. | |
| 5,511,387 A * | 4/1996 | Tinsler | B60H 1/00585 62/149 |
| 6,058,719 A * | 5/2000 | Cochran | F25B 49/005 62/129 |
| 2009/0013700 A1* | 1/2009 | Unezaki | F25B 13/00 62/77 |

(Continued)

FOREIGN PATENT DOCUMENTS

| | | | |
|---|---|---|---|
| JP | H0282060 A | * | 3/1990 |
| JP | H02263051 A | * | 10/1990 |

OTHER PUBLICATIONS

Kitauchi et al, Refrigerating Plant, Oct. 25, 1990, JPH02263051A, Whole Document (Year: 1990).*

(Continued)

*Primary Examiner* — Larry L Furdge
(74) *Attorney, Agent, or Firm* — Womble Bond Dickinson (US) LLP

(57) ABSTRACT

Embodiments relate generally to subcooling control of a heating, ventilation, and air conditioning (HVAC) system. An HVAC system may include a compressor, a first heat exchanger, a refrigerant vessel having an inlet fluidly coupled to a discharge conduit extending from the compressor, and the refrigerant vessel having an outlet fluidly coupled to a liquid conduit, the liquid conduit configured to pass liquid refrigerant between the first heat exchanger and a second heat exchanger. The HVAC system may further include an electronic expansion valve (EEV) fluidly coupled between the discharge conduit and the inlet of the refrigerant vessel, wherein the EEV is configured to modulate and divert a portion of vapor refrigerant flowing through the discharge conduit into the refrigerant vessel to control subcooling (SC) produced by the HVAC system.

18 Claims, 5 Drawing Sheets

(56) References Cited

U.S. PATENT DOCUMENTS

| | | | | |
|---|---|---|---|---|
| 2009/0151377 A1* | 6/2009 | Yonemori | ............ | F25B 49/005 |
| | | | | 62/203 |
| 2013/0213083 A1* | 8/2013 | Higashiiue | .............. | F25B 41/20 |
| | | | | 62/500 |
| 2014/0360223 A1* | 12/2014 | Setoguchi | ............... | F25B 1/005 |
| | | | | 62/509 |
| 2015/0107290 A1 | 4/2015 | Hatomura et al. | | |
| 2015/0135751 A1* | 5/2015 | Tamaki | ................. | F25B 49/005 |
| | | | | 62/196.1 |
| 2017/0016659 A1 | 1/2017 | Chen et al. | | |
| 2017/0059219 A1 | 3/2017 | Goel | | |
| 2018/0252449 A1* | 9/2018 | Ito | ........................... | F25B 45/00 |

OTHER PUBLICATIONS

Aoyama et al., Heat Pump Type Air Conditioner, Mar. 22, 1990, JPH0282060A, Whole Document (Year: 1990).*

Rite, Raymond Walter; U.S. Appl. No. 16/428,297, filed May 31, 2019; Title: Refrigerant Charge Management with Subcooling Control; 38 pages.

* cited by examiner (Prior Art Figure)

REFRIGERANT VOLUME CONTROL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a heating, ventilation, and air conditioning (HVAC) system, an amount of refrigerant charge circulating through heat exchange coils of the HVAC system impacts operating efficiency and subcooling (SC). An incorrect refrigerant charge level may cause excessively low or high levels of SC, thereby negatively impacting efficiency of the HVAC system.

SUMMARY

In an embodiment, an HVAC system may include a compressor, a first heat exchanger, a refrigerant vessel having an inlet fluidly coupled to a discharge conduit extending from the compressor, and the refrigerant vessel having an outlet fluidly coupled to a liquid conduit, the liquid conduit configured to pass liquid refrigerant between the first heat exchanger and a second heat exchanger. The HVAC system may further include an electronic expansion valve (EEV) fluidly coupled between the discharge conduit and the inlet of the refrigerant vessel, wherein the EEV is configured to modulate and divert a portion of vapor refrigerant flowing through the discharge conduit into the refrigerant vessel to control SC produced by the HVAC system.

In an embodiment, an HVAC system may include a compressor, a first heat exchanger, a refrigerant vessel having an inlet fluidly coupled to a discharge conduit extending from the compressor, and the refrigerant vessel having an outlet fluidly coupled to a liquid conduit, the liquid conduit configured to pass liquid refrigerant between the first heat exchanger and a second heat exchanger. The HVAC system may further include an electronic expansion valve (EEV) fluidly coupled between the discharge conduit and the inlet of the refrigerant vessel, wherein the EEV is configured to modulate and divert a portion of vapor refrigerant flowing through the discharge conduit into the refrigerant vessel to control SC produced by the HVAC system. The HVAC system may further include temperature and pressure sensors in fluid communication with the liquid refrigerant, and a system controller configured to control the EEV based on temperature and pressure measurements received from the temperature and pressure sensors.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
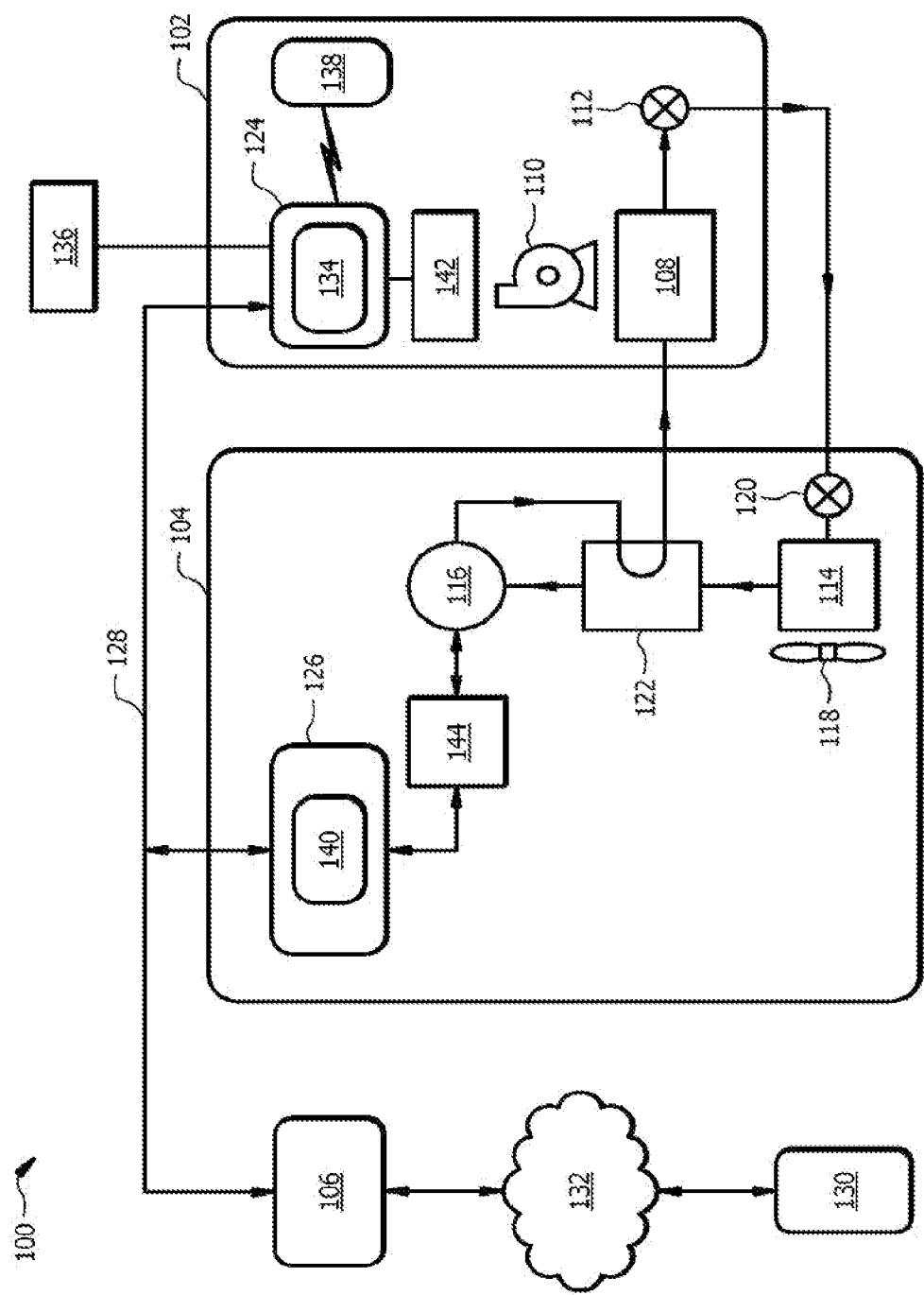
FIG. 1 illustrates a typical HVAC system.

Excessive refrigerant inside an HVAC system can cause damage to the compressor. The excess refrigerant or overcharge can flood the compressor and damage its mechanical components. Also, an overcharged HVAC system creates a higher pressure inside the system which increases the use of power. Therefore, the HVAC system may not achieve the desired efficiency. Undercharged HVAC systems may also suffer from poor performance due to low suction pressure upstream of the compressor.

Additionally, in an HVAC system including a heat pump, the heat pump may be properly charged in a cooling mode, but due to differences in internal volumes of an outdoor coil and an indoor coil, the SC may be higher or lower than desired when the heat pump is in a heating mode.

The present disclosure relates generally to systems and methods to control SC generated by a condenser of an HVAC system including a heat pump and/or an air conditioner. Specifically, systems and methods of the present disclosure employ techniques for controlling an EEV to divert a portion of vapor refrigerant exiting a compressor, into a refrigerant vessel to control SC.

In some embodiments, the refrigerant vessel may be fluidly coupled to a refrigerant discharge vapor conduit of a compressor and a refrigerant liquid conduit. An EEV may be positioned between the refrigerant vessel and the refrigerant discharge vapor conduit and fluidly couple the refrigerant vessel and the refrigerant discharge vapor conduit. A system controller may control the EEV to modulate a flow of vapor from the refrigerant discharge vapor conduit into the refrigerant vessel. The vapor may condense within the refrigerant vessel.

A rate of condensation of the vapor refrigerant within the refrigerant vessel determines the rate at which the vapor refrigerant is modulated by the EEV into the refrigerant vessel. To increase SC in the HVAC system, the vapor refrigerant may be fed by the EEV at a lower flow rate than the condensation rate of the vapor refrigerant, thereby decreasing the amount of liquid refrigerant formed (condensed from the vapor refrigerant) in the refrigerant vessel. In contrast, to decrease SC in the HVAC system, vapor refrigerant may be fed by the EEV at a higher flow rate than the condensation rate of the vapor refrigerant, thereby increasing the amount of liquid refrigerant formed in the refrigerant vessel. A steady state is achieved when SC is not changing because the flow rate of vapor refrigerant into the refrigerant vessel is equal to the rate of condensation of the vapor refrigerant.

The rate of condensation may be controlled by insulating the refrigerant vessel. That is, insulation may be positioned around the refrigerant vessel to decrease heat transfer between the refrigerant vessel and the environment immediately surrounding the refrigerant vessel, thereby decreasing the rate of condensation. Vapor may flow into the refrigerant vessel and displace liquid refrigerant via a fluid connection between the refrigerant vessel and the refrigerant liquid conduit. The amount of liquid refrigerant produced in the vessel and displaced into the refrigerant liquid conduit controls the SC generated by the condenser. The liquid refrigerant flows into the liquid conduit due to a pressure differential between the vessel and the liquid conduit. That is, pressure in the vessel may be higher than pressure in the liquid conduit.

A slower rate of condensation, as opposed to a faster rate, causes a decreased amount of liquid refrigerant to form in the refrigerant vessel, which corresponds with an increased amount of refrigerant circulating (e.g., available refrigerant) in the HVAC system. This increased amount of circulating refrigerant in the condenser causes an increase in SC.

In contrast, a faster rate of condensation causes an increased amount of liquid refrigerant to form in the refrigerant vessel, which corresponds with a decreased amount of refrigerant circulating in the HVAC system. This decreased amount of circulating refrigerant in the condenser causes a decrease in SC.

The system controller may monitor pressure and temperature of liquid refrigerant in a liquid conduit via pressure and temperature sensors. SC is a function of pressure and temperature, as will be understood by one having skill in the art. Therefore, based on pressure and temperature measurements received, the system controller modulates the EEV to allow more or less vapor to enter the refrigerant vessel to achieve a desired SC. Alternatively, the system controller directs the EEV to remain in a fixed position to maintain a flow rate of vapor into the refrigerant vessel to maintain the desired SC.

Referring now to FIG. 1, a schematic diagram of a typical HVAC system 100 is shown. Most generally, HVAC system 100 comprises a heat pump system that may be selectively operated to implement one or more substantially closed thermodynamic refrigeration cycles to provide a cooling functionality (hereinafter "cooling mode") and/or a heating functionality (hereinafter "heating mode"). The HVAC system 100, configured as a heat pump system, generally comprises an indoor unit 102, an outdoor unit 104, and a system controller 106 that may generally control operation of the indoor unit 102 and/or the outdoor unit 104.

Indoor unit 102 generally comprises an indoor air handling unit comprising an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 to promote heat transfer between the airflow and a refrigerant flowing through the indoor heat exchanger 108. The indoor fan 110 may also be configured to deliver temperature-conditioned air from the indoor unit 102 to one or more areas and/or zones of a climate controlled structure. The indoor fan 110 may generally comprise a mixed-flow fan and/or any other suitable type of fan. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, however, the indoor fan 110 may be a single speed fan.

The indoor metering device 112 may generally comprise an electronically-controlled motor-driven EEV. In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In alternative embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the indoor heat exchanger 108. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, however, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flow path of refrigerant through the reversing valve 122 and consequently the HVAC system 100. Additionally, the reversing valve 122 may also be selectively controlled by the system controller 106 and/or an outdoor controller 126.

The system controller 106 may generally be configured to selectively communicate with an indoor controller 124 of the indoor unit 102, an outdoor controller 126 of the outdoor unit 104, and/or other components of the HVAC system 100. In some embodiments, the system controller 106 may be configured to control operation of the indoor unit 102 and/or the outdoor unit 104. In some embodiments, the system controller 106 may be configured to monitor and/or communicate with a plurality of temperature sensors associated with components of the indoor unit 102, the outdoor unit 104, and/or the ambient outdoor temperature. Additionally, in some embodiments, the system controller 106 may comprise a temperature sensor and/or may further be configured to control heating and/or cooling of zones associated with the HVAC system 100. In other embodiments, however, the system controller 106 may be configured as a thermostat for controlling the supply of conditioned air to zones associated within the HVAC system 100.

The system controller 106 may also generally comprise an input/output (I/O) unit (e.g., a graphical user interface, a touchscreen interface, or the like) for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, however, the system controller 106 may not comprise a display and may derive all information from inputs from remote sensors and remote configuration tools.

In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

The HVAC system 100 is shown configured for operating in a so-called heating mode in which heat may generally be absorbed by refrigerant at the outdoor heat exchanger 114 and rejected from the refrigerant at the indoor heat exchanger 108. Starting at the compressor 116, the compressor 116 may be operated to compress refrigerant and pump the relatively high temperature and high pressure compressed refrigerant through the reversing valve 122 and to the indoor heat exchanger 108, where the refrigerant may transfer heat to an airflow that is passed through and/or into contact with the indoor heat exchanger 108 by the indoor fan 110. After exiting the indoor heat exchanger 108, the refrigerant may flow through and/or bypass the indoor metering device 112, such that refrigerant flow is not substantially restricted by the indoor metering device 112. Refrigerant generally exits the indoor metering device 112 and flows to the outdoor metering device 120, which may meter the flow of refrigerant through the outdoor metering device 120, such that the refrigerant downstream of the outdoor metering device 120 is at a lower pressure than the refrigerant upstream of the outdoor metering device 120. From the outdoor metering device 120, the refrigerant may enter the outdoor heat exchanger 114. As the refrigerant is passed through the outdoor heat exchanger 114, heat may be transferred to the refrigerant from an airflow that is passed through and/or into contact with the outdoor heat exchanger 114 by the outdoor fan 118. Refrigerant leaving the outdoor heat exchanger 114 may flow to the reversing valve 122, where the reversing valve 122 may be selectively configured to divert the refrigerant back to the compressor 116, where the refrigeration cycle may begin again.

Alternatively, to operate the HVAC system 100 in a so-called cooling mode, most generally, the roles of the indoor heat exchanger 108 and the outdoor heat exchanger 114 are reversed as compared to their operation in the above-described heating mode. For example, the reversing valve 122 may be controlled to alter the flow path of the refrigerant from the compressor 116 to the outdoor heat exchanger 114 first and then to the indoor heat exchanger 108, the indoor metering device 112 may be enabled, and the outdoor metering device 120 may be disabled and/or bypassed. In cooling mode, heat may generally be absorbed by refrigerant at the indoor heat exchanger 108 and rejected by the refrigerant at the outdoor heat exchanger 114. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. Additionally, as refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114.

Figure 2:
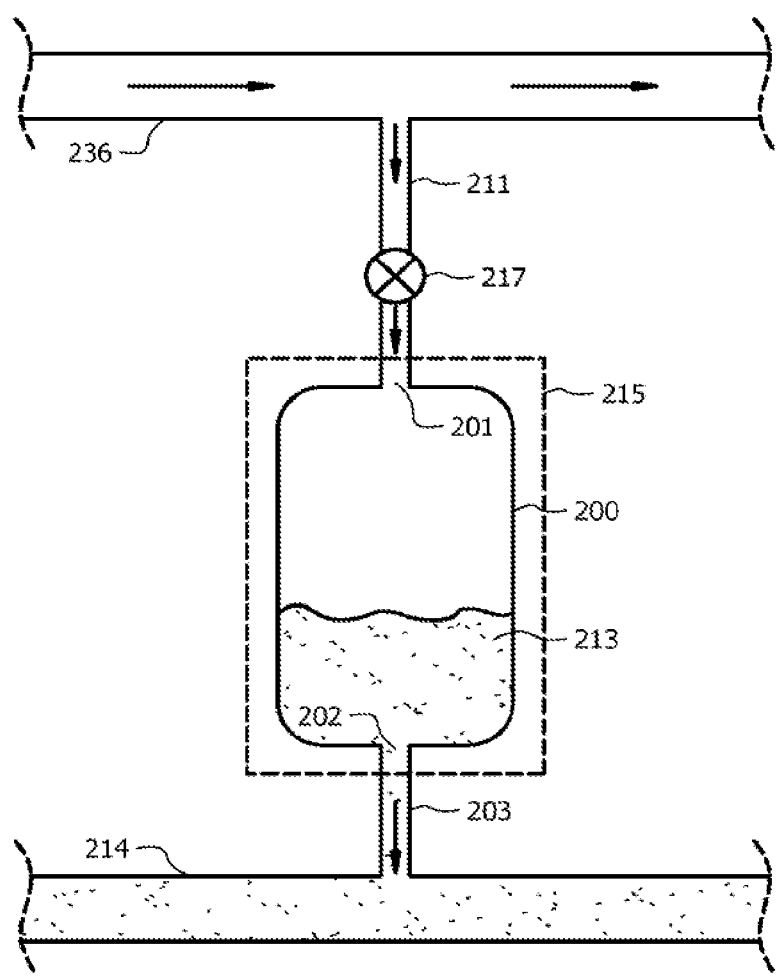
FIG. 2 illustrates a refrigerant vessel to control SC, in accordance with an embodiment of the disclosure.

FIG. 2 illustrates refrigerant vessel 200 in accordance with an embodiment of the disclosure. Vessel 200 may be a high pressure vessel made of, for example but not limited to, metal such as steel, to withstand high pressures and temperatures. Vessel 200 may include inlet 201 and outlet 202. The internal volume of vessel 200 may range from 0.18 cubic feet to 0.54 cubic feet. That is one pound ("lb") of refrigerant occupies 0.18 cubic feet. Vessel 200 may contain 1 to 3 lbs of refrigerant (e.g., 2 lbs). 2 lbs is typically an amount of refrigerant that may be added or depleted from an HVAC system.

For example, an HVAC service technician, in the field, may adjust an amount of refrigerant in the HVAC system by about 2 lbs with an external tank of refrigerant to achieve a desired SC. Depending on ambient conditions (e.g., outdoor and/or indoor conditions), SC may be adjusted or maintained. For example, an SC of 10 Fahrenheit (° F.) may be desired for an ambient temperature of 82° F. Whereas, an SC of 14° F. may be desired for an ambient temperature of 92° F., for example. A benefit of vessel 200 is that vessel 200 may take the place of the external refrigerant tank and allows an HVAC system to achieve a specified SC without refrigerant adjustment by the HVAC service technician.

Figure 3:
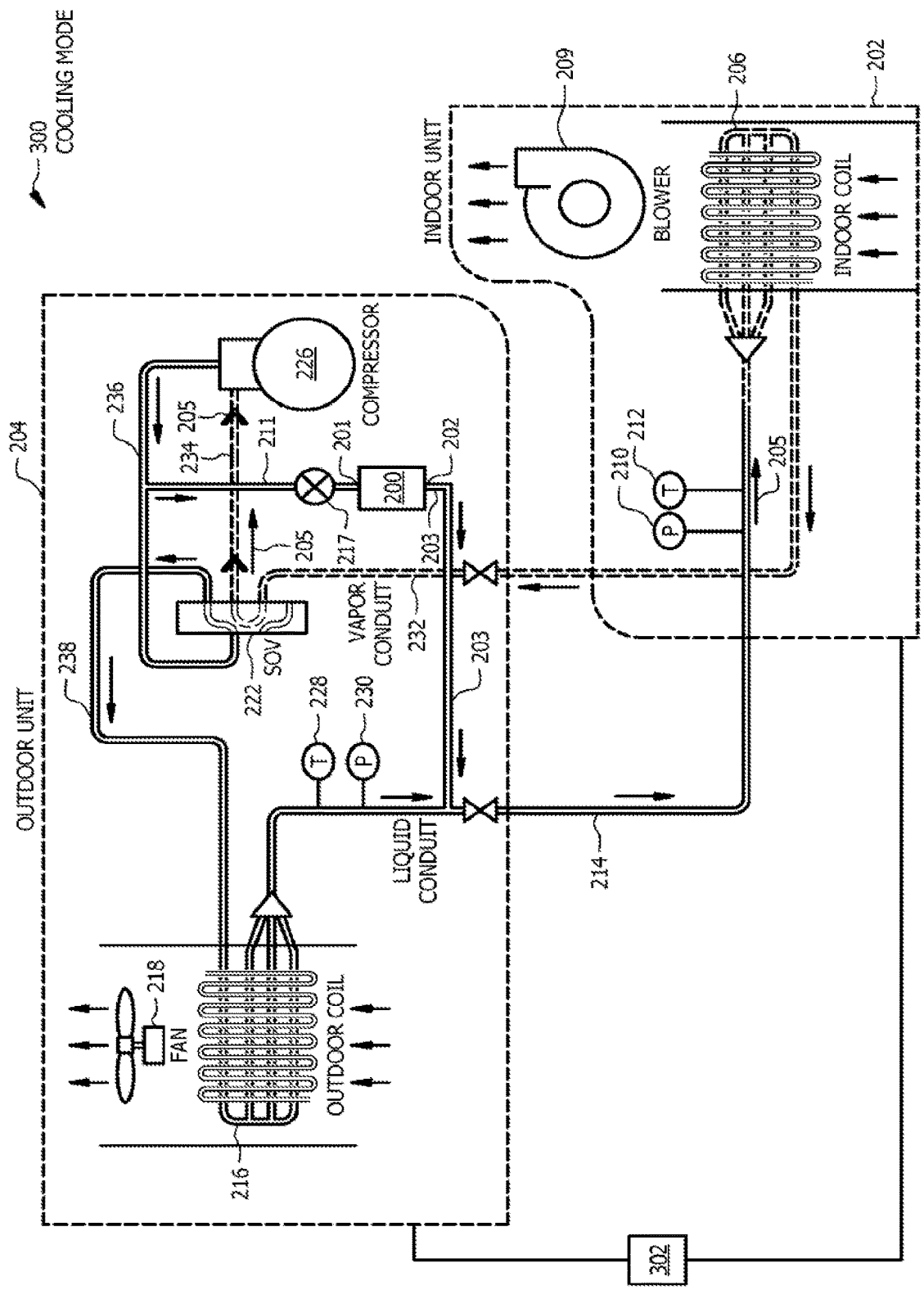
FIG. 3 illustrates an HVAC system, with the refrigerant vessel, operating in a cooling mode, in accordance with an embodiment of the disclosure.
Figure 4:
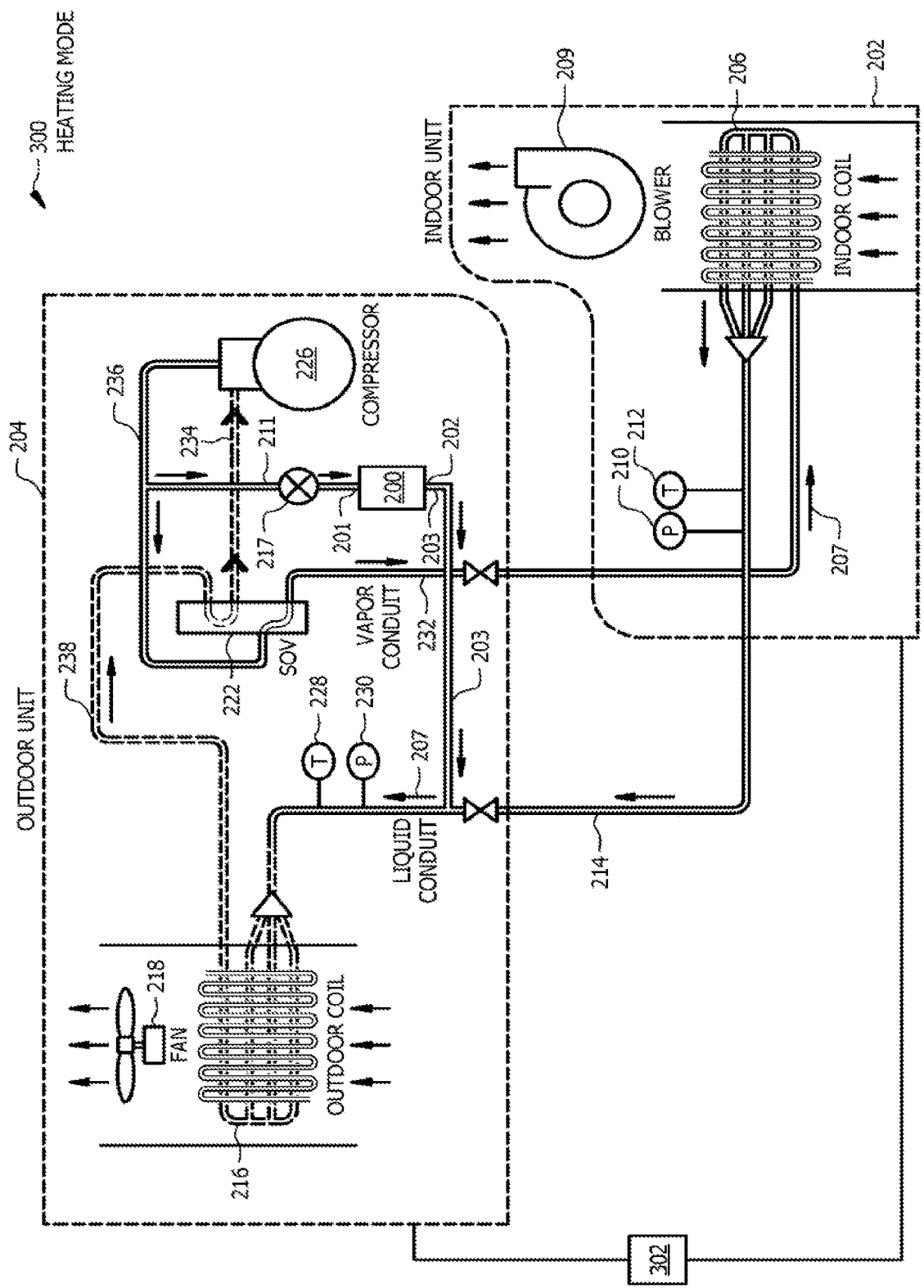
FIG. 4 illustrates an HVAC system, with the refrigerant vessel, operating in a heating mode, in accordance with an embodiment of the disclosure.
Figure 5:
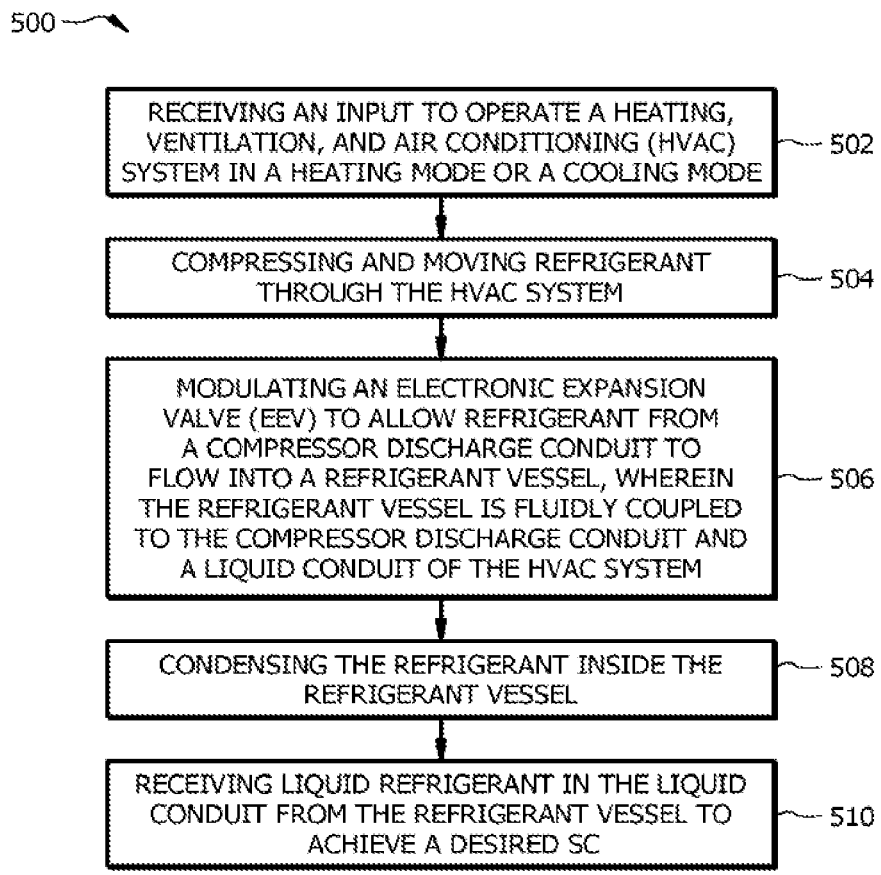
FIG. 5 is a flow chart illustrating operational steps of an HVAC system, with the refrigerant vessel, in the heating or cooling mode, in accordance with an embodiment of the disclosure.

With additional reference to FIGS. 3-5, vessel 200 may be fluidly coupled to compressor discharge conduit 236 and liquid conduit 214. Discharge conduit 236 receives discharged refrigerant from compressor 226. Vessel 200 is configured to receive a portion of vapor refrigerant flowing through discharge conduit 236 via EEV 217. Refrigerant vessel 200 is positioned downstream of compressor 226 and fluidly couples discharge conduit 236 to liquid conduit 214.

High pressure refrigerant in vapor phase exits discharge conduit 236 into conduit 211. EEV 217 is fluidly coupled to conduit 211. EEV 217 modulates to allow an amount of the high pressure refrigerant to enter vessel 200, depending on the desired SC. The pressure in discharge conduit 236 may be greater than the pressure in vessel 200 (and liquid conduit 214), thereby causing vapor refrigerant to flow from discharge conduit 236 into vessel 200. The vapor refrigerant from discharge conduit 236 cools and condenses within vessel 200, and then flows into liquid conduit 214. The liquid refrigerant flows into liquid conduit 214 due to a pressure differential between vessel 200 and liquid conduit 214. That is, a pressure in vessel 200 may be higher than a pressure in liquid conduit 214.

Once inside vessel 200, the refrigerant condenses to produce liquid, shown as liquid level 213. The liquid refrigerant exits vessel 200 and enters liquid conduit 214 via conduit 203. Liquid level 213 corresponds to the desired SC.

The rate of condensation (and the liquid level) within vessel 200 and the resulting amount of liquid refrigerant displaced from vessel 200 into liquid conduit 214 affect the SC produced by HVAC system 300.

A desired SC can be maintained or controlled by modulating EEV 217 such that a rate of refrigerant (in a vapor phase) flowing into vessel 200 is equivalent to a rate of condensation of the refrigerant. A faster rate of condensation allows vessel 200 to fill with liquid refrigerant quicker, as compared to a slower rate of condensation. A lesser amount of liquid refrigerant in vessel 200 causes a higher SC. In contrast, a higher amount of liquid refrigerant in vessel 200 causes a lower SC.

For example, if vessel 200 is full with liquid refrigerant, then the SC will be lower as compared to when vessel 200 is empty. That is, an empty vessel 200 causes a higher SC. In other words, if more liquid refrigerant is stored in vessel 200, then there is less refrigerant flowing throughout the HVAC system causing a lower SC. In contrast, if less liquid refrigerant is stored in vessel 200, then there is more refrigerant flowing throughout the HVAC system causing a higher SC.

The rate of condensation can be increased by increasing a flow rate of vapor refrigerant into vessel 200. And the rate of condensation can be decreased by decreasing the flow rate of vapor refrigerant into vessel 200.

Additionally, the rate of condensation may be controlled by encapsulating vessel 200 with insulation 215. Insulation 215 may include material (e.g., a blanket) made of fiber glass and/or plastic, for example. Insulation 215 may be utilized to control heat transfer between the liquid refrigerant in vessel 200 and the surrounding environment. This control of heat transfer controls the rate of condensation within vessel 200.

As will be understood by one having skill in the art, SC may be calculated from pressure and temperature measurements. System controller 302 calculates an actual SC value and compares it to a desired or specified SC value or threshold. System controller 302 may be configured to control SC by measuring a temperature and a pressure, via temperature sensor 212 and pressure sensor 210 during a cooling mode or via temperature sensor 228 and pressure sensor 230 during a heating mode, of liquid refrigerant, and modulating EEV 217 based on temperature and pressure measurements of liquid refrigerant in liquid conduit 214. System controller 302 may monitor temperatures and pressures periodically or continuously.

The sensors (e.g., temperature sensor 212 and pressure sensor 210) closest to indoor coil 206 during a cooling mode allow for a more accurate calculation of SC because these sensors measure temperature and pressure of refrigerant in liquid conduit 214 immediately before the refrigerant enters indoor coil 206, as opposed to sensors further upstream (e.g., temperature sensor 228 and pressure sensor 230).

In contrast, the sensors (e.g., temperature sensor 228 and pressure sensor 230) closest to outdoor coil 216 during a heating mode allow for a more accurate calculation of SC because these sensors measure temperature and pressure of refrigerant in liquid conduit 214 immediately before the refrigerant enters outdoor coil 216, as opposed to sensors further upstream (e.g., temperature sensor 210 and pressure sensor 212).

System controller 302 may be similar to system controller 106. System controller 302 may include inputs for selecting or adjusting a desired SC value, and a display for displaying a current SC value and the desired SC value. Also, system controller 302 may store information including various types of refrigerants, and their corresponding saturation temperatures at different pressures, or system controller 302 may have access to a database that stores this information (e.g., wireless or wired communication with the database). This information is readily available from pressure-temperature charts for different types of refrigerants, as will be understood by one having skill in the art.

For example, system controller 302 may calculate the SC by first receiving the temperature and pressure measurements from the sensors. Then, system controller 302 determines or looks up a corresponding saturation temperature for the measured pressure based on the pressure-temperature information or chart. Then, system controller 302 subtracts the measured temperature (liquid conduit temperature) from the corresponding saturation temperature to calculate the SC. Table 1 illustrates measured pressures and corresponding saturation temperatures for a refrigerant utilized in HVAC systems, R-410A, for example.

TABLE 1

Measured Pressures and Corresponding Saturation Temperatures for R-410A.

| Measured Pressure (pounds per square inch gauge, PSIG) | Saturation Temperature (° F.) |
|---|---|
| 12 | −38 |
| 48 | 0 |
| 80 | 21 |
| 160 | 56 |
| 320 | 101 |

If SC is below a desired value or threshold, system controller 302 modulates EEV 217 to reduce an amount of vapor phase refrigerant entering vessel 200 from discharge conduit 236, thereby decreasing a rate of condensation and thus a liquid level in vessel 200. This increases an amount of circulating refrigerant in HVAC system 300 and thus increases the SC until the threshold is satisfied.

If SC is above a desired value or threshold, system controller 302 modulates EEV 217 to increase an amount of vapor phase refrigerant entering vessel 200 from discharge conduit 236, thereby increasing a rate of condensation and thus a liquid level in vessel 200. This decreases an amount of circulating refrigerant in HVAC system 300 and thus decreases the SC until the threshold is satisfied.

Upon reaching the desired threshold SC, EEV 217 ceases to modulate and remains in a fixed position (open or closed) to maintain the desired SC. That is, system controller 302 may be configured to maintain EEV 217 in a fixed position to maintain the desired SC. This process of determining, and adjusting or maintaining the SC may repeat as needed to achieve the desired SC. In certain embodiments, EEV 217 is always controlling the SC while HVAC system 300 is operating, and EEV 217 modulates to achieve the desired SC during any operating condition at any time. For example, EEV 217 controls the SC during system commissioning, periodic testing, run cycle(s), or every time a heat pump switches modes. EEV 217 also modulates in response to changing ambient temperatures.

FIG. 3 illustrates vessel 200 implemented into HVAC system 300 operating in a cooling mode. HVAC system 300 may be similar to HVAC system 100, and may include a heat pump and/or an air conditioner. HVAC system 300 may include indoor unit 202 (shown by dashed lines) and outdoor unit 204 (shown by dashed lines). System controller 302 may control operation of HVAC system 300.

Indoor unit 202 may include indoor coil 206 (e.g., a heat exchanger), blower 209, pressure sensor 210, and temperature sensor 212. Indoor coil 206 is an evaporator coil in the cooling mode. Outdoor coil 216 is a condenser in the cooling mode.

Outdoor unit 204 may include outdoor coil 216 (e.g., a heat exchanger), fan 218, SOV 222, compressor 226, temperature sensor 228, and pressure sensor 230. Vapor conduit 232 may fluidly couple indoor coil 206 to SOV 222. SOV 222 may be fluidly coupled to compressor 226 via conduit 234. Discharge conduit 236 may fluidly couple compressor 226 to SOV 222. Conduit 211 may be fluidly coupled to discharge conduit 236, EEV 206, and vessel 200, as shown. Vessel 200 may be fluidly coupled to liquid line 214. Temperature sensors 228 and 212 may be fluidly coupled to liquid conduit 214. Pressure sensors 230 and 210 may also be fluidly coupled to liquid line 214.

SOV 222 may be fluidly coupled to outdoor coil 216 via conduit 238. SOV 222 may be a reversing valve that controls the direction of the flow of refrigerant through HVAC system 300, depending on a heating mode setting or a cooling mode setting of system controller 302. In the cooling mode, the refrigerant circulates in an opposite direction, as compared to a heating mode. Direction of refrigerant flow in the cooling mode is shown by arrows 205.

FIG. 4 illustrates vessel 200 implemented into HVAC system 300 operating in a heating mode. HVAC system 300 may include a heat pump and/or an air conditioner. HVAC system 300 may include indoor unit 202 (shown by dashed lines) and outdoor unit 204 (shown by dashed lines). System controller 302 may control operation of HVAC system 300.

Indoor unit 202 may include indoor coil 206, blower 209, pressure sensor 210, and temperature sensor 212. Indoor coil 206 is an evaporator coil in the cooling mode. Outdoor coil 216 is a condenser in the cooling mode.

SOV 222 may be fluidly coupled to outdoor coil 216 via conduit 238. SOV 222 may be a reversing valve that controls the direction of the flow of refrigerant through HVAC system 300, depending on a heating mode setting or a cooling mode setting of system controller 302. In the heating mode, the refrigerant circulates in an opposite direction, as compared to the cooling mode. Direction of refrigerant flow in the heating mode is shown by arrows 207.

An example operation of vessel 200 is shown on flow chart 500 of FIG. 5. At step 502, system controller 302 receives an input to operate HVAC system 300 in a heating mode or a cooling mode. At step 504, system controller 302 directs compressor 226 to compress and move refrigerant through HVAC system 300. At step 506, system controller 302 directs EEV 206 to modulate to allow a portion of vapor refrigerant from discharge conduit 236 to flow into vessel 200, depending on a desired SC. At step 508, vapor refrigerant that has entered vessel 200 condenses inside vessel 200 to form liquid refrigerant. At step 510, the liquid refrigerant from vessel 200 flows into liquid conduit 214 to achieve a desired SC. Based on a desired SC of HVAC system 300, liquid level 213 may be maintained or adjusted. Liquid level 213 is correlated with SC produced by HVAC system 300, as noted above with respect to the rate of condensation.

In certain embodiments, EEV 217 may completely close before system controller 302 switches modes (e.g., heating mode to cooling mode or cooling mode to heating mode). This complete closure of EEV 217 causes liquid refrigerant to flow from liquid conduit 214 into vessel 200 and completely fill vessel 200. This closure of EEV 217 during a transition period between the modes minimizes or prevents a backflow of liquid refrigerant from entering into compressor 226 from vessel 200, because there may be liquid refrigerant remaining in vessel 200 that is trapped between EEV 217 and liquid conduit 214 during the transition period. In some embodiments, a maximum refrigerant charge robbing capacity occurs when EEV 217 closes completely and vessel 200 fills completely with liquid refrigerant.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A heating, ventilation, and air conditioning (HVAC) system comprising:
   a compressor;
   a first heat exchanger;
   a refrigerant vessel having an inlet fluidly coupled to a discharge conduit extending from the compressor, and the refrigerant vessel having an outlet fluidly coupled to a liquid conduit, the liquid conduit configured to pass liquid refrigerant between the first heat exchanger and a second heat exchanger, wherein the liquid conduit comprises a temperature sensor and a pressure sensor;
   insulation that encapsulates the refrigerant vessel to control a rate of condensation of a vapor refrigerant within the refrigerant vessel;
   an electronic expansion valve (EEV) fluidly coupled between the discharge conduit and the inlet of the refrigerant vessel, wherein the EEV is configured to modulate and divert a portion of the vapor refrigerant flowing through the discharge conduit into the refrigerant vessel to control subcooling (SC) produced by the HVAC system;
   a system controller configured to control the EEV based on measurements from the temperature and pressure sensors.

2. The HVAC system of claim 1, wherein an internal volume of the refrigerant vessel ranges from 0.18 cubic feet to 0.54 cubic feet.

3. The HVAC system of claim 1, wherein the temperature and pressure sensors are adjacent to the first heat exchanger.

4. The HVAC system of claim 1, the temperature and pressure sensors are adjacent to the second heat exchanger.

5. The HVAC system of claim 1, further comprising a switch over valve (SOV) to switch a circulation direction of the liquid refrigerant based on a heating mode or a cooling mode.

6. The HVAC system of claim 1, wherein the EEV is configured to remain in a fixed open position to maintain a liquid level of refrigerant in the refrigerant vessel to maintain a desired SC.

7. A heating, ventilation, and air conditioning (HVAC) system comprising:
a compressor;
a first heat exchanger;
a refrigerant vessel having an inlet fluidly coupled to a discharge conduit extending from the compressor, and the refrigerant vessel having an outlet fluidly coupled to a liquid conduit, the liquid conduit configured to pass liquid refrigerant between the first heat exchanger and a second heat exchanger, wherein the liquid conduit comprises temperature and pressure sensors;
an electronic expansion valve (EEV) fluidly coupled between the discharge conduit and the inlet of the refrigerant vessel, wherein the EEV is configured to modulate and divert a portion of vapor refrigerant flowing through the discharge conduit into the refrigerant vessel to control subcooling (SC) produced by the HVAC system;
a system controller configured to control the EEV based on temperature er and pressure measurements of the liquid refrigerant received from the temperature and pressure sensors.

8. The HVAC system of claim 7, wherein an internal volume of the refrigerant vessel ranges from 0.18 cubic feet to 0.54 cubic feet.

9. The HVAC system of claim 7, wherein the system controller is configured to adjust the EEV to increase a flow rate of vapor refrigerant into the refrigerant vessel, to decrease the SC.

10. The HVAC system of claim 7, wherein the system controller is configured to adjust the EEV to decrease a flow rate of vapor refrigerant into the refrigerant vessel, to increase the SC.

11. The HVAC system of claim 7, wherein the system controller is configured to maintain the EEV in a fixed position to maintain a flow rate of vapor refrigerant into the refrigerant vessel, to maintain the SC.

12. The HVAC system of claim 7, wherein the temperature and pressure sensors are adjacent to the first heat exchanger.

13. The HVAC system of claim 7, wherein the temperature and pressure sensors are adjacent to the second heat exchanger.

14. The HVAC system of claim 7, further comprising a switch over valve (SOV) to switch a circulation direction of the liquid refrigerant based on a heating mode or a cooling mode.

15. A heating, ventilation, and air conditioning (HVAC) system comprising:
a compressor;
a first heat exchanger;
a refrigerant vessel having an inlet fluidly coupled to a discharge conduit extending from the compressor, and the refrigerant vessel having an outlet fluidly coupled to a liquid conduit, the liquid conduit configured to pass liquid refrigerant between the first heat exchanger and a second heat exchanger, wherein the liquid conduit comprises temperature and pressure sensors;
an electronic expansion valve (EEV) fluidly coupled between the discharge conduit and the inlet of the refrigerant vessel,
a switch over valve (SOV) to switch a circulation direction of the liquid refrigerant based on a heating mode or a cooling mode; and
a system controller configured to:
calculate subcooling (SC) based on temperature and pressure measurements of the liquid refrigerant received from the temperature and pressure sensors;
modulate the EEV to adjust an amount of vapor refrigerant flowing through the discharge conduit into the refrigerant vessel until a desired SC is achieved;
switch the circulation direction of the liquid refrigerant with the SOV to change modes;
calculate, after the switch, the SC based on the temperature and the pressure measurements of the liquid refrigerant received from the temperature and the pressure sensors; and
modulate the EEV to adjust the amount of vapor refrigerant flowing through the discharge conduit into the refrigerant vessel until the desired SC is achieved.

16. The HVAC system of claim 15, wherein an internal volume of the refrigerant vessel ranges from 0.18 cubic feet to 0.54 cubic feet.

17. The HVAC system of claim 15, further comprising an outdoor ambient temperature sensor;
wherein the system controller is further configured to modulate the EEV based on ambient temperatures determined by the outdoor ambient temperature sensor.

18. The HVAC system of claim 15, wherein the system controller is further configured to completely close the EEV during a transition period between the cooling mode and the heating mode to prevent a backflow of refrigerant into the compressor.

* * * * *